US006304716B1

(12) United States Patent
Hanai et al.

(10) Patent No.: US 6,304,716 B1
(45) Date of Patent: Oct. 16, 2001

(54) APPARATUS FOR MANAGEMENT OF INFORMATION OF PROGRAM RECORDED ON VIDEO TAPE, METHOD FOR MANAGEMENT OF PROGRAM RECORDED ON VIDEO TAPE, RECORDER/REPRODUCER, AND RECORDING/REPRODUCING METHOD

(75) Inventors: Tomoyuki Hanai, Kanagawa; Yasutomo Nishina, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/051,844

(22) PCT Filed: Aug. 22, 1997

(86) PCT No.: PCT/JP97/02928

§ 371 Date: Jul. 28, 1998

§ 102(e) Date: Jul. 28, 1998

(87) PCT Pub. No.: WO98/08222

PCT Pub. Date: Feb. 26, 1998

(30) Foreign Application Priority Data

Aug. 23, 1996 (JP) ........................................................ 8-23997

(51) Int. Cl.[7] ......................... H04N 5/782; H04N 5/7828
(52) U.S. Cl. ............................................... 386/95; 386/81
(58) Field of Search .................................... 386/95, 83, 46, 386/52, 1, 4, 55, 81, 64; 360/32; 348/7, 5; H04N 5/782, 5/7828

(56) References Cited

U.S. PATENT DOCUMENTS 5,541,738 * 7/1996 Mankovitz .............................. 386/83

FOREIGN PATENT DOCUMENTS

| 4-291046 | 10/1992 | (JP) . |
| 4-319566 | 11/1992 | (JP) . |
| 4-366487 | 12/1992 | (JP) . |
| 8-87869 | 4/1996 | (JP) . |

* cited by examiner

Primary Examiner—Robert Chevalier
(74) Attorney, Agent, or Firm—Frommer Lawrence & Haug LLP.; William S. Frommer

(57) ABSTRACT

An apparatus and method for managing information concerning programs recorded on a tape-like recording medium. Superimposed on a tape-like recording medium is program information pertaining to the tape-like recording medium, the programs recorded on the tape-like recording medium and the addresses of the recorded programs, as well as, any other additional information needed for management of tape-like recording mediums. The program information is additionally stored in a tape library for managing the recorded programs, but if a device mistakenly gives a particular tape unrelated program information, the management of the recorded programs on the particular tape becomes difficult. The apparatus, therefore, compensates for any errors by reconstructing the tape library, thereby, linking the program information superimposed on the recording medium with updated program information in the tape library.

10 Claims, 10 Drawing Sheets

PROGRAM IDENTIFICATION INFORMATION

| TAPE NUMBER [1 TO n] |
|---|
| DATA (ADDRESS DATA. etc.) |

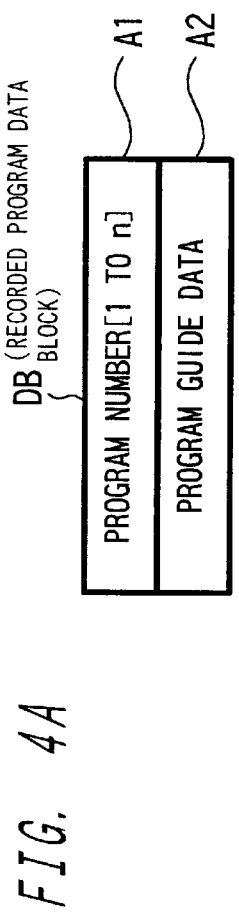

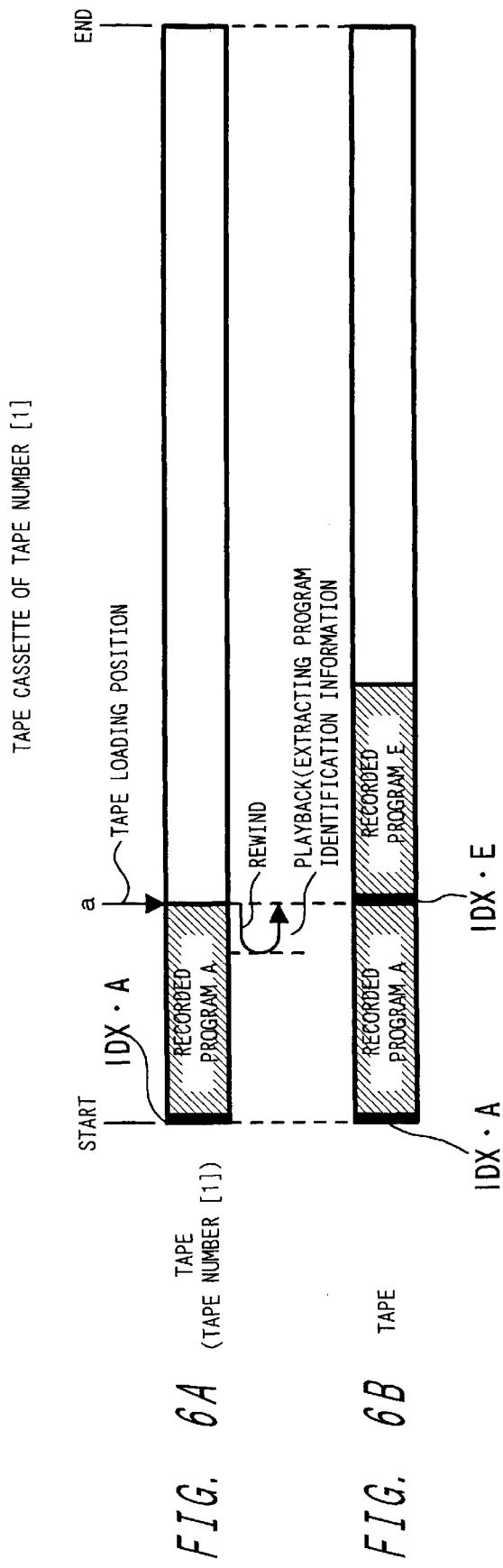

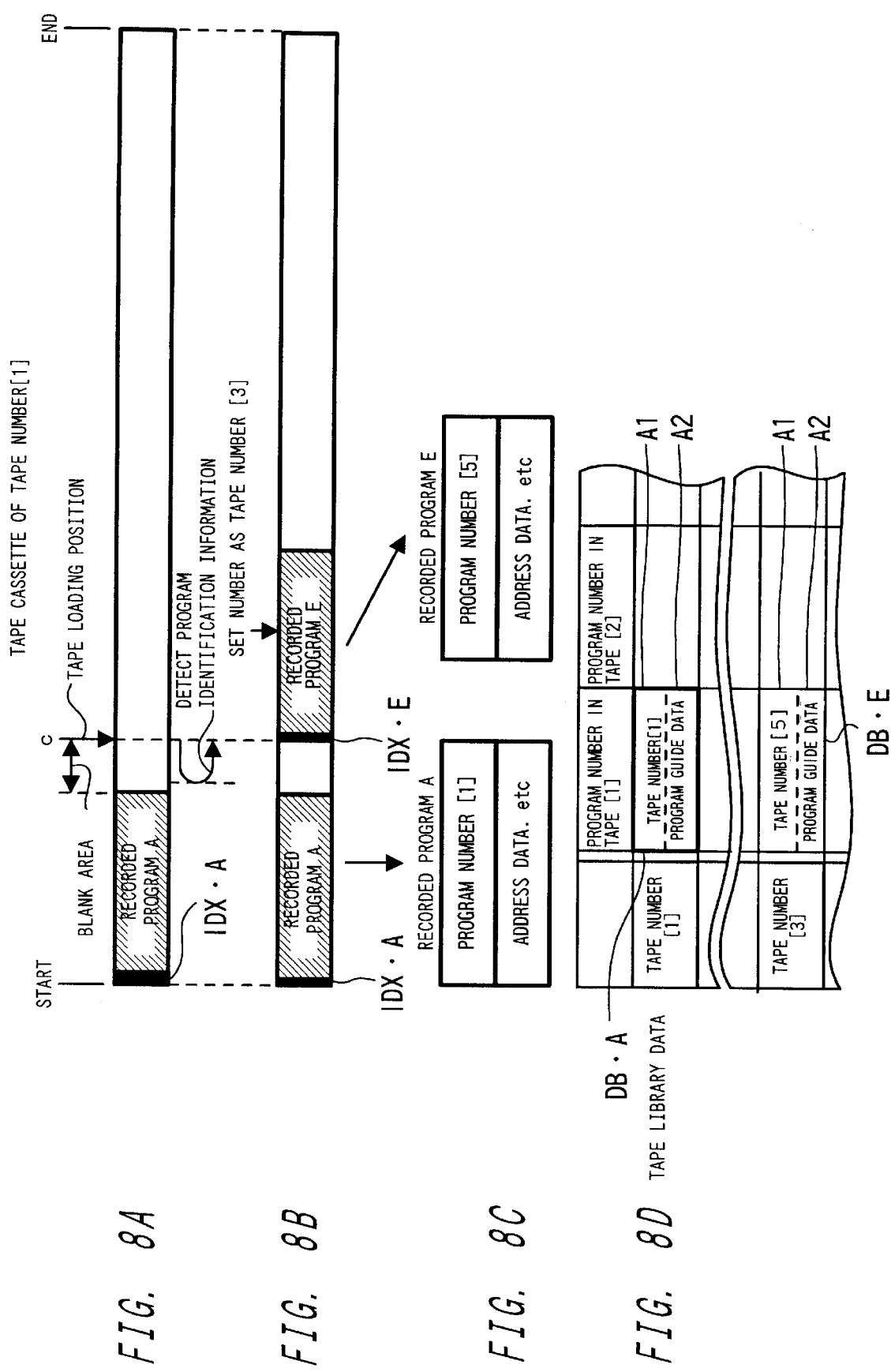

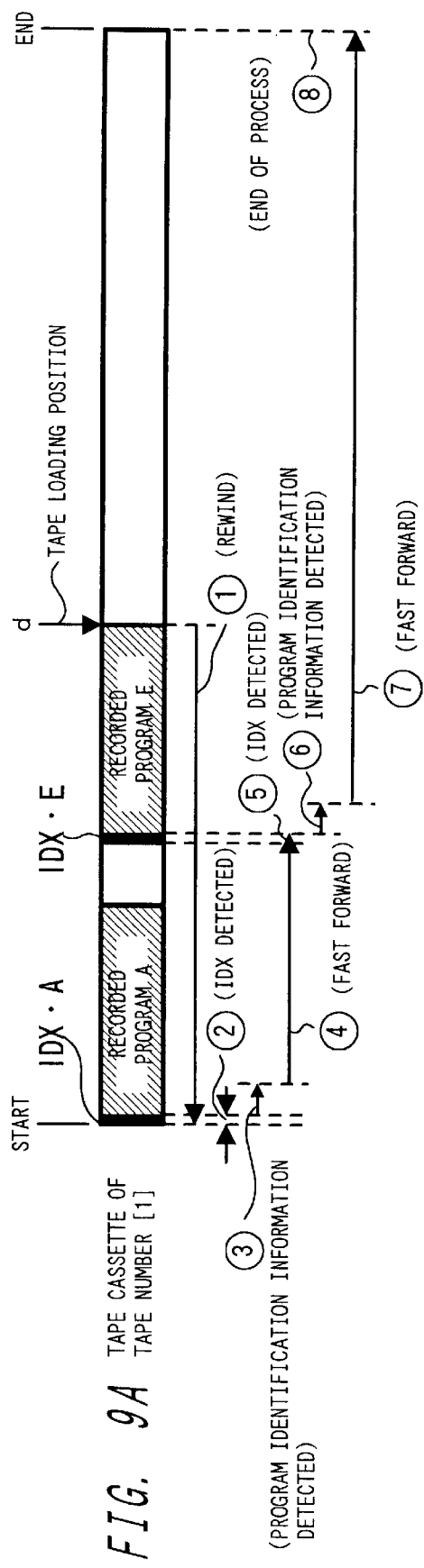
FIG. 9A TAPE CASSETTE OF TAPE NUMBER [1]
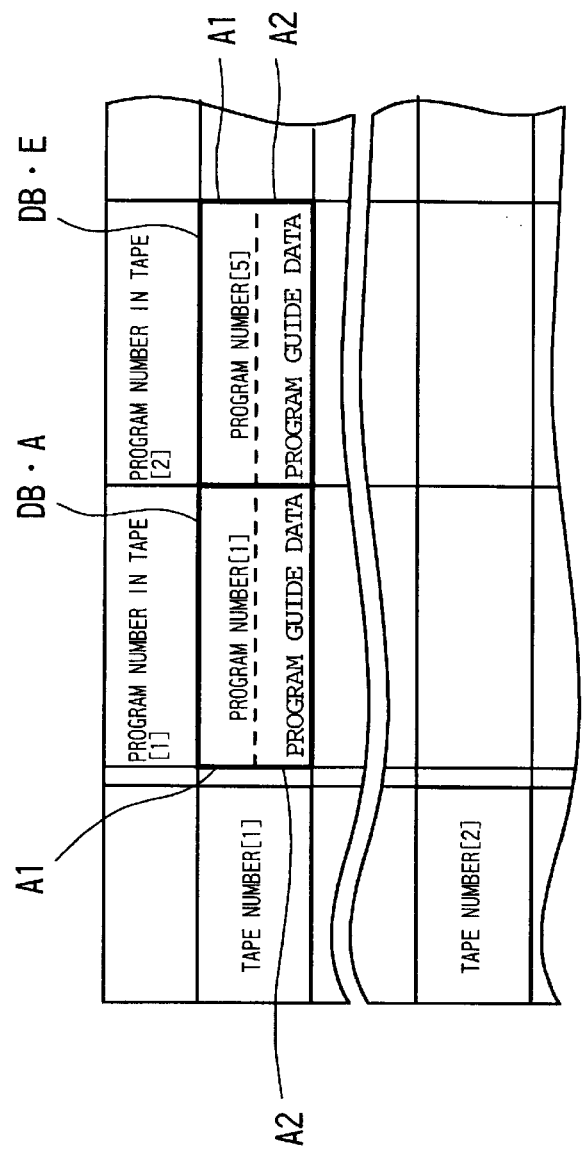
FIG. 9B TAPE LIBRARY DATA (AFTER RECONSTRUCTION)

APPARATUS FOR MANAGEMENT OF INFORMATION OF PROGRAM RECORDED ON VIDEO TAPE, METHOD FOR MANAGEMENT OF PROGRAM RECORDED ON VIDEO TAPE, RECORDER/REPRODUCER, AND RECORDING/REPRODUCING METHOD

TECHNICAL FIELD

The present invention relates to a recorded program information managing apparatus and a recorded program information managing method for managing recorded program information of programs recorded on a tape-like recording medium such as a video cassette tape or the like, and a recording and reproducing apparatus and a recording and reproducing method with a recorded program information managing function provided by such a recorded program information managing apparatus and a recorded program information managing method.

BACKGROUND ART

According to one process of providing users with information relative to programs recorded in a video cassette by a VTR (Video Tape Recorder), a recording area dedicated for recorded program information is established on a leading portion of a magnetic tape in the video cassette, and, when necessary, the recording area for recorded program information is played back to obtain recorded program information, which is displayed as a recorded program guide on a monitor screen. The user can see the recorded program information displayed on the monitor screen to recognize contents of programs recorded in the video cassette presently loaded in the VTR, the order in which the programs are recorded, and recording start/end positions (times) on the tape.

With the above method of providing the recorded program guide, however, since recorded program information is recorded on magnetic tapes in video cassettes, the user is required to repeatedly load video cassettes into and eject video cassettes from the VTR until the user finds the particular video cassette in which a desired program that the user wants to see is recorded. Therefore, the user needs to perform a tedious and time-consuming task.

Furthermore, because the recording area for recorded program information is positioned on the leading portion of a video cassette tape, if the video cassette tape has been wound partway, then the user needs a time to rewind the video cassette up to its leading portion in order to see the recorded program information. This also puts the user under stress.

There has been known a process of recording a program by establishing a tape number with which to identify a tape on which the program is recorded and a program number with which to identify the program, storing information of the tape number and the program number in a tape library memory in a VTR in association with given program guide data, and superimposing the information of the tape number and the program number and address information indicative of a tape-like recording position upon a vertical blanking period of the video signal of the recorded program.

In order for the VTR to establish a tape number in recording a program in a tape cassette, the VTR plays back the loaded tape cassette for several seconds. If there is a program which has already been recorded in the tape cassette, the VTR detects a tape number that has been recorded together with the video signal of the recorded program, establishes the same tape number as the detected tape number, and thereafter starts to record the program. If there is no program which has already been recorded in the tape cassette even after the tape cassette has been played back for several seconds, then the VTR regards the tape cassette as a virgin tape cassette, and establishes a new tape number.

To establish a program number, the VTR searches the tape library memory using the tape number detected as described above, determines a program number to be established, and establishes the program number.

With identification information being thus allotted and managed to identify recorded programs, if the tape number of a certain recorded program can be identified when the loaded video cassette is played back for a short period of time, then it is possible to read and display program guide information that has been stored in the tape library memory according to the identified tape number. Therefore, necessary program guide information can be obtained through a playback for a short period of time. In addition, a label marked with a number corresponding to a tape number established by the VTR may be applied to the casing of the tape cassette. When information regarding programs recorded in the tape cassette is displayed on the basis of data stored in the tape library memory, the user can easily recognize the position where a desired program is recorded on the cassette tape.

When the VTR is about to establish a tape number for a certain tape cassette in which programs have already been recorded, if the tape cassette is loaded into the VTR with a blank (unrecorded) tape area positioned at the playback head, then since no recorded programs are detected by a playback started from the blank tape area for several seconds, the VTR decides that the tape cassette is a virgin tape cassette. In this case, the VTR establishes a new tape number, records the established tape number in the video signal of a program, and stores information of the recorded program together with information of the established tape number in the tape library memory. Consequently, though a plurality of programs are recorded on the same video tape, different tape numbers are recorded in their video signals, and these programs are managed as being recorded on different tapes in the tape library data. As a result, the programs actually recorded on the video tape do not match the management data presented as program guide information.

DISCLOSURE OF THE INVENTION

It is an object of the present invention to provide a recorded program guide function that can easily be used by the user, by solving the above problems. Another object of the present invention is to perform memory management as efficiently as possible in managing recorded program information to achieve a match between programs actually recorded on a video tape and management data presented as program guide information.

A recorded program information managing apparatus for managing information concerning a recorded program recorded on a tape-shaped recording medium includes a recorded program information setting means for setting as a recorded program information a recording medium number information indicative of different recording medium numbers assigned to tape-shaped recording media where at least recorded programs are recorded and a program number information indicative of different program numbers assigned to recorded programs, a recording control means for recording at least the program number information as a recorded program identification information on a tape-shaped recording medium with superposing the program number information on a video signal of the recorded program, a storing means for storing the program number information as recorded program information concerning respective recorded programs recorded on the tape-shaped recording medium so that the program number information should correspond to the recording medium number information assigned to the tape-shaped recording medium where a recorded program to which the program number information is assigned is recorded, and a reconstruction means for, if the storing means stores program number information of recorded programs recorded on the same tape-shaped recording medium in correspondence with different recording medium number informations, carrying out a reconstruction processing for managing uniformly recording medium numbers to which recorded programs recorded on the same tape-shaped recording medium should correspond.

The reconstruction means includes an identification information extracting means for extracting the program number information recorded with respect to each recorded program form the tape-shaped recording medium to be subjected to the reconstruction processing, and a storage control means which can store the program number information of each of the recorded programs extracted by the identification information extracting means so that the program number information should correspond to predetermined recording medium number.

A recorded program information managing method of managing information concerning a recorded program recorded on a tape-shaped recording medium includes a recorded program information setting step of setting as a recorded program information a recording medium number information indicative of different recording medium numbers assigned to tape-shaped recording media where at least recorded programs are recorded and a program number information indicative of different program numbers assigned to recorded programs, a recording control step of recording at least the program number information as a recorded program identification information on a tape-shaped recording medium with superposing the program number information on a video signal of the recorded program, a storage control step of storing the program number information as recorded program information concerning respective recorded programs recorded on the tape-shaped recording medium so that the program number information should correspond to the recording medium number information assigned to the tape-shaped recording medium where a recorded program to which the program number information is assigned is recorded, and a reconstruction step of, if the storing means stores program number information of recorded programs recorded on the same tape-shaped recording medium in correspondence with different recording medium number informations, carrying out a reconstruction processing for managing uniformly recording medium numbers to which recorded programs recorded on the same tape-shaped recording medium should correspond.

The reconstruction step includes an identification information extracting step of extracting the program number information recorded with respect to each recorded program form the tape-shaped recording medium to be subjected to the reconstruction processing, and a storage control step for reconstruction which can store the program number information of each of the recorded programs extracted in the identification information extracting step so that the program number information should correspond to predetermined recording medium number.

A recording and reproducing apparatus having a recording and reproducing means for recording and reproducing a tape-shaped recording medium includes a recorded program information setting means for setting as a recorded program information a recording medium number information indicative of different recording medium numbers assigned to tape-shaped recording media where at least recorded programs are recorded and a program number information indicative of different program numbers assigned to recorded programs, a recording control means for recording at least the program number information as a recorded program identification information on a tape-shaped recording medium with superposing the program number information on a video signal of the recorded program, and a storing means for storing the program number information as recorded program information concerning respective recorded programs recorded on the tape-shaped recording medium so that the program number information should correspond to the recording medium number information assigned to the tape-shaped recording medium where a recorded program to which the program number information is assigned is recorded, thereby making it possible to manage information concerning the recorded programs recorded on the tape-shaped recording medium.

The recording and reproducing apparatus further includes a reconstruction means for, if the storing means stores program number information of recorded programs recorded on the same tape-shaped recording medium in correspondence with different recording medium number informations, carrying out a reconstruction processing for managing uniformly recording medium numbers to which recorded programs recorded on the same tape-shaped recording medium should correspond. The reconstruction means includes an identification information extracting means for extracting the program number information recorded with respect to each recorded program form the tape-shaped recording medium to be subjected to the reconstruction processing, and a storage control means which can store the program number information of each of the recorded programs extracted by the identification information extracting means so that the program number information should correspond to predetermined recording medium number.

A recording and reproducing method having a recording and reproducing means for recording and reproducing a tape-shaped recording medium includes a recorded program information setting step of setting as a recorded program information a recording medium number information indicative of different recording medium numbers assigned to tape-shaped recording media where at least recorded programs are recorded and a program number information indicative of different program numbers assigned to recorded programs, a recording control step of recording at least the program number information as a recorded program identification information on a tape-shaped recording medium with superposing the program number information on a video signal of the recorded program, and a storage control step of storing the program number information as recorded program information concerning respective recorded programs recorded on the tape-shaped recording medium so that the program number information should correspond to the recording medium number information assigned to the tape-shaped recording medium where a recorded program to which the program number information is assigned is recorded, thereby making it possible to manage information concerning the recorded programs recorded on the tape-shaped recording medium.

The recording and reproducing method further includes a step of setting a reconstruction mode of, if the storing means stores program number information of recorded programs recorded on the same tape-shaped recording medium in correspondence with different recording medium number informations, carrying out a reconstruction processing for managing uniformly recording medium numbers to which recorded programs recorded on the same tape-shaped recording medium should correspond. The reconstruction mode includes an identification information extracting step of extracting the program number information recorded with respect to each recorded program form the tape-shaped recording medium to be subjected to the reconstruction processing, and a storage control step for reconstruction which can store the program number information of each of the recorded programs extracted in the identification information extracting step so that the program number information should correspond to predetermined recording medium number.

According to the above arrangements, by utilizing the identification of program numbers recorded on the tape-like recording medium with respect to each recorded program and the identification information of program numbers corresponding to the recording medium number stored in the storage means (storage area), the recorded programs recorded on the tape-like recording medium is managed by a unit of the tape-like recording medium (video cassette). When the reconstruction processing according to the present invention is carried out, the identification data such as the recording medium number or the like is recorded on the tape-like recording medium with being superposed on the video signal. Therefore, even if it is impossible to rewrite the identification directly, it is possible to manage the recorded programs with unifying mismatched recording-medium numbers on the same tape-like recording medium.

Since the reconstruction processing according to the present invention is carried out, it is possible to manage the recorded programs with unifying mismatched recording-medium numbers of the recorded programs on the same tape-like recording medium.

According to the recorded-program information management form according to the present invention including the reconstruction processing, only the program number of the recording-medium number and the program number is employed as the identification information recorded on the tape-like recording medium and based on the program number the recorded program information is managed so that the information should correspond to the recording-medium numbers on the memory in the apparatus side. Therefore, it is possible to comparatively simplify the processing concerning the management of the recorded program information including the above reconstruction processing.

BRIEF DESCRIPTION OF DRAWINGS

FIGS. 4A and 4B are diagrams illustrative of a data mapping structure of tape library data;

FIGS. 6A through 6B are diagrams used to explain an example of recording the program identification information and storing the tape library data upon the recording;

FIGS. 8A through 8D are diagrams illustrative of an example of a process of recording programs with different tape numbers assigned thereto in the same video cassette;

FIGS. 9A through 9C are diagrams illustrative of a reconstruction process according to the embodiment together with a procedure thereof.

BEST MODE FOR CARRYING OUT THE INVENTION

An embodiment of the present invention will hereinafter be described with reference to FIGS. 1 through FIGS. 10A and 10B.

According to the present embodiment, an electronic program guide display apparatus capable of displaying an electronic program guide based on program table data transmitted in superimposed relationship to a television signal in a certain broadcasting channel is combined with a recording and reproducing apparatus having a recorded program information managing apparatus according to the present invention, thereby providing an electronic program guide display apparatus which can provide recorded program information as an electronic program guide.

The embodiment will be described under the following sequence of headings:

(1. Arrangement of electronic program guide display apparatus according to the embodiment)

(2. Mode transitions of EPN according to the embodiment)

(3. Management of recorded program information)
   (a. Program identification information recorded on a magnetic tape)
   (b. Data contents of a tape library memory)
   (c. Correspondence of recorded state of recorded program to tape library data)
   (d. Example of recorded program information constructed upon recording operation)
   (e. Example of a process of cueing up and playing back a tape using recorded program information)

(4. Reconstruction process for recorded program information)

Figure 1:
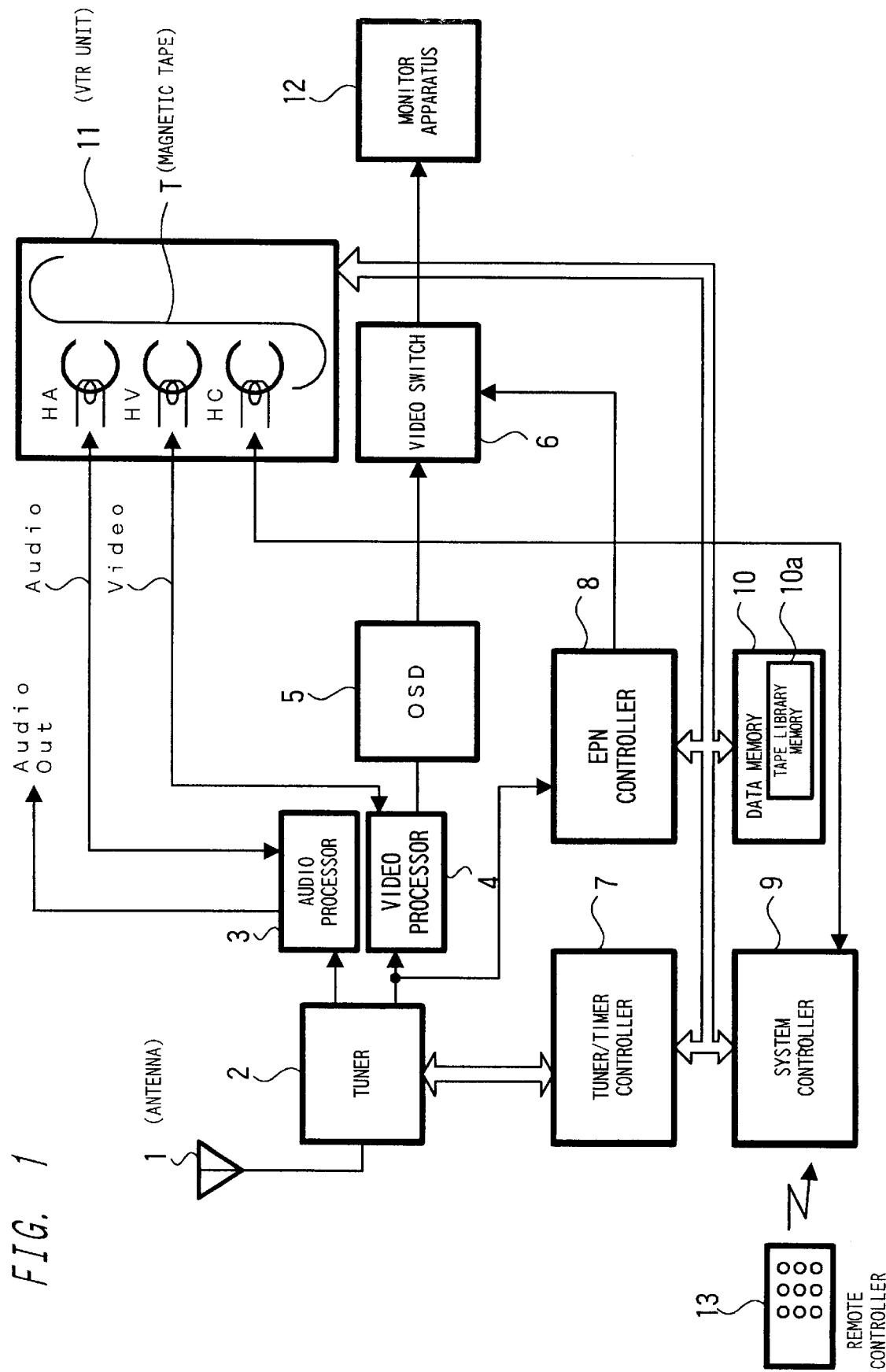
FIG. 1 is a block diagram of an electronic program display control apparatus according to an embodiment of the present invention.

(1. Arrangement of electronic program guide display apparatus according to the embodiment):

FIG. 1 is a block diagram of an electronic program display control apparatus according to an embodiment of the present invention. In this embodiment, as described above, information of broadcast programs and information of programs recorded in a video cassette by a VTR are displayed as an electronic program guide. Such an electronic program guide will be referred to as an "EPN (Electrical Program Navigator".

In FIG. 1, a broadcast wave received by an antenna 1 is supplied to a tuner 2 which selects a channel to be received.

A video signal in the selected channel is supplied to a video processor 4 and an EPN controller 8, and an audio signal in the selected channel is supplied to an audio processor 3.

The audio processor 3 processes the supplied audio signal according to a predetermined signal processing process, and outputs an audio output signal Audio Out. The audio processor 3 is connected to an audio signal recording/playback head HA of a VTR 11. In a recording mode of the VTR 11, the audio processor 3 operates to supply the processed audio signal to the audio signal recording/playback head HA, which records the audio signal on a magnetic tape T in a video cassette. In a playback mode of the VTR 11, the audio processor 3 operates to receive and process an audio signal reproduced from the magnetic tape T by the audio signal recording/playback head HA, and output an audio output signal Audio Out.

The video processor 4 processes the supplied video signal according to a predetermined signal processing process, and outputs a processed video signal to a video signal recording/playback head HV and an on-screen display unit 5.

In the recording mode of the VTR 11, the video processor 4 operates to supply the processed audio signal to the video signal recording/playback head HV, which records the video signal on the magnetic tape T. In the playback mode of the VTR 11, the video processor 4 operates to receive and process a video signal reproduced from the magnetic tape T by the audio signal recording/playback head HV, and output the processed video signal to the on-screen display unit 5.

The on-screen display unit 5 superimposes a video signal representing necessary characters, symbols, etc. upon the video signal supplied from the video processor 4, so that those characters and symbols are superimposed upon an image displayed on a monitor device 12.

A video switch 6 selects or combines an ordinary video signal (a video signal received and selected by the tuner 2 and a video signal reproduced by the VTR 11) which is outputted from the on-screen display unit 5 and an EPN video signal which is outputted from the EPN controller 8 (described later on). According to the present embodiment, the video switch 6 is capable of combining a video signal of an EPN image which is outputted from the EPN controller 8 with a video signal which is outputted from the on-screen display unit 5 for thereby displaying the windows of an EPN image superimposed upon an ordinary image on the display screen of the monitor device 12.

The monitor device 12 displays video signals supplied from the video switch 6.

The VTR 11 records audio and video signals supplied respectively from the audio processor 3 and the video processor 4 on the magnetic tape T in the video cassette respectively with the audio signal recording/playback head HA and the video signal recording/playback head HV. The VTR 11 also reproduces audio and video signals recorded on the magnetic tape T in the video cassette respectively with the audio signal recording/playback head HA and the video signal recording/playback head HV, and supplies the reproduced audio and video signals respectively to the audio processor 3 and the video processor 4.

In the present embodiment, the recording/reproducing mode of the VTR 11 is controlled by a tuner/timer controller 7, and the VTR 11 can be controlled by the tuner/timer controller 7 to record a program received and selected by the tuner 2. The VTR 11 can also be controlled by the tuner/timer controller 7 to program and record a broadcast program (a program received/selected by the tuner 2) based on a designated selected channel and a programmed recording time.

According to the present embodiment, "program identification information", which is identification information to identify recorded programs and has table-of-contents information of recorded programs, is inserted in given positions in video signals of recorded programs, and recorded on the magnetic tape. The program identification information is used as information for recognizing programs recorded on the tape for cueing up and playing back the tape using the EPN and also for carrying out a reconstruction process on the video cassette. The program identification information will be described later on.

The VTR 11 has a control head HC for recording/reproducing a control signal, which is generated on the basis of a vertical synchronizing signal for the purpose of achieving synchronization in the playback mode, in and from a control track on the tape. The control head HC is controlled by a system controller 9 to record an index signal IDX indicative of positions where programs start being recorded in the control track. In this embodiment, the index signal IDX is used to scan recorded programs in cueing up and playing back the tape and also in the reconstruction process for the video cassette. The index signal IDX will be described later on.

The tuner/timer controller 7 serves to control the tuner 2 to select stations and also control the VTR 11 to program timer-controlled program recording, etc.

The EPN controller 8 serves to output an EPN video signal and effect a control process relative to the display of such an EPN video signal.

In this embodiment, a data signal of an electronic program guide which provides guide information relative to broadcast programs is inserted into given horizontal lines in a vertical blanking period of a video signal transmitted from a transmitting station. The EPN controller 8 is supplied with a video signal received/selected by the tuner 2, extracts the data signal of an electronic program guide from the video signal, and decodes the data signal into electronic program guide data. The electronic program guide data thus produced is stored in a data memory 10. When necessary, the EPN controller 8 reads the electronic program guide data (and program identification information, described later on) stored in the data memory 10, generates an EPN video signal from the electronic program guide data, and supplies the EPN video signal to the video switch 6 for thereby displaying an EPN on the monitor device 12.

The system controller 9 comprises a microcomputer, etc. and controls various functional circuits. The system controller 9 has a receiver (not shown) for receiving a remote control signal transmitted from a remote controller 13 and producing command information. Based on the command information, the system controller 9 controls the various functional circuits described above.

The data memory 10 comprises a non-volatile memory or the like, and has an area for storing electronic program guide data relative to broadcast programs which is generated by the EPN controller 8.

In this embodiment, when a broadcast program is recorded by the VTR 11, the EPN controller 8 generates predetermined data regarding the recorded program as a recording event, which is stored in the data memory 10. The data memory 10 has a tape library memory 10a as an area for storing program information relative to the recorded program. Program information relative to recorded programs comprises library information of each video cassette (video cassette). Therefore, the recorded program information will also referred to as "tape library data". Contents of the "tape library data" will be described later on.

The "electronic program guide data" relative to broadcast data and the "tape library data" will hereinafter collectively be referred to as EPN data.

The remote controller 13 has various keys for manipulating the various functional circuits shown in FIG. 1, and transmits command signals corresponding to the keys as they are operated, as infrared or radio-wave signals.

The remote controller 13 has keys, not shown, for effecting various operations on the EPN image as described later on. These keys include an "EPN key", a "command key", "cursor keys" for moving a cursor displayed in the windows of the EPN image in upward, downward, leftward, and rightward directions, entering numerical values, and turning on/off function settings, and an "EXE key" for making decisions.

Figure 2:
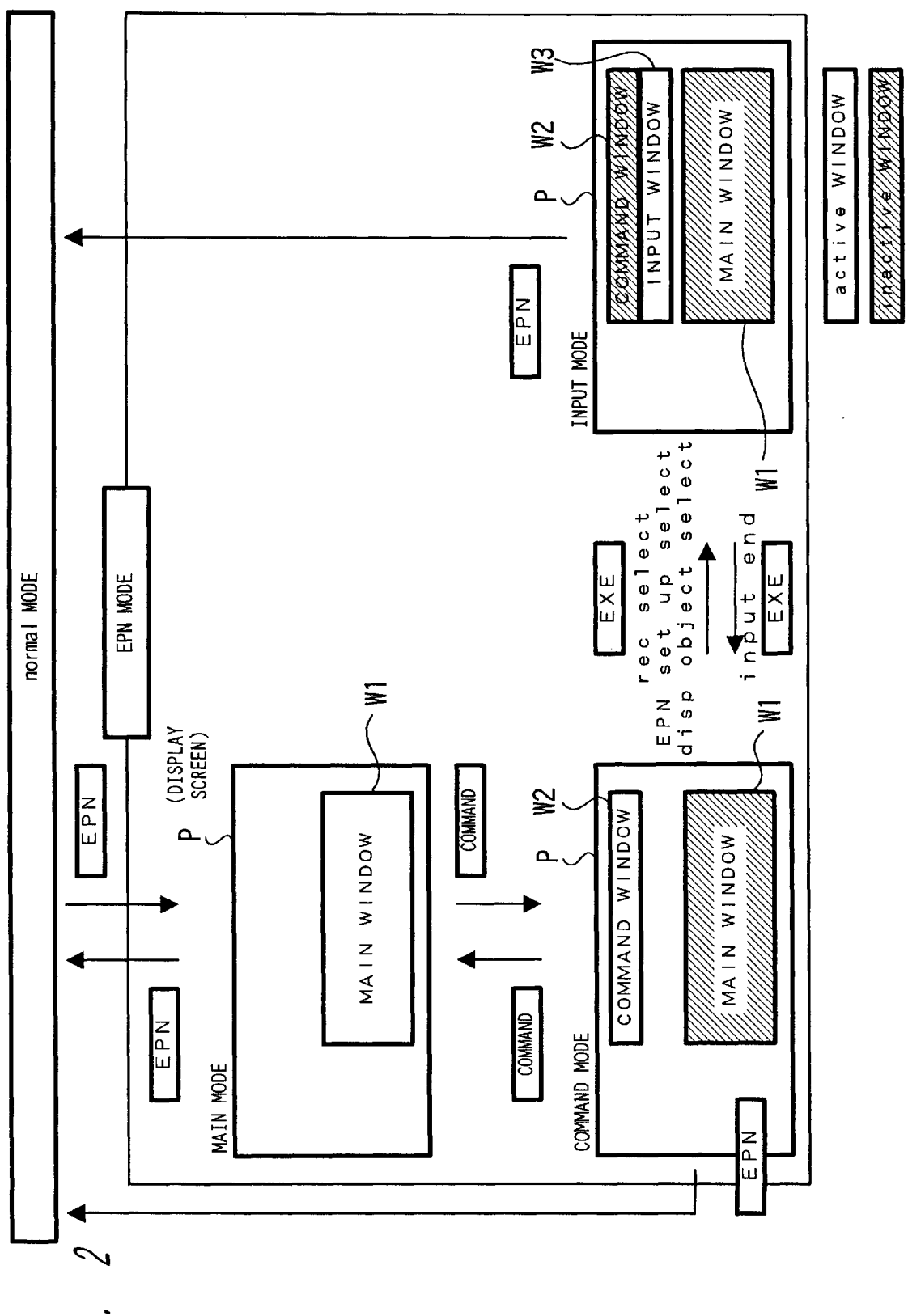
FIG. 2 is a diagram showing mode transitions of EPN according to displayed forms thereof.

(2. Mode transitions of EPN according to the embodiment):

Mode transitions of an EPN according to the embodiment will be described below with reference to FIG. 2. FIG. 2 shows mode transitions of an EPN together with the displayed windows of an EPN image.

In FIG. 2, a normal mode is an ordinary display mode for displaying video images received/selected by the tuner 2 as described above or video images reproduced by the VTR 11. In this embodiment, an EPN mode for displaying EPN images is established in addition to the normal mode. The "EPN" key is operated to switch between the normal mode and the EPN mode.

The EPN mode has a MAIN mode, a COMMAND mode, and an INPUT mode.

In this embodiment, when the normal mode switches to the EPN mode with the "EPN" key, the MAIN mode is first selected as shown in FIG. 2.

In the MAIN mode, a MAIN window W1 is displayed in a display image P as shown in FIG. 2. The image displayed in the normal mode, for example, is continuously displayed in the area of the display image P other than the MAIN window W1. Alternatively, a blue background image is displayed in the area of the display image P other than the MAIN window W1.

In the MAIN window W1, there are displayed program information (program information about programs scheduled to be broadcast) of an electronic program guide depending on the display mode and information of programs recorded so far in the video cassette by the VTR 11, according to a display form described later on.

In the MAIN mode, there are established four navigate modes which include, for example, [all channel navigate], [this channel navigate], [all tape navigate], and [this tape navigate] modes.

The [all channel navigate] mode is a mode capable of providing all information about a program being broadcast at present or programs scheduled to be broadcast subsequently. The [this channel navigate] mode is a mode for providing information about a program being broadcast at present or programs scheduled to be broadcast subsequently in a channel that has been designated by a certain operation.

The [all tape navigate] mode is a mode for providing information relative to recorded programs in all video cassettes which have been recorded by the VTR 11, by referring to all tape library data stored in the tape library memory 10a. The [this tape navigate] mode is a mode for providing information relative to recorded programs in a video cassette which has been selected by a certain operation among video cassettes which have recorded by the VTR 11.

By switching between the above four navigate modes, the displayed contents of the EPN are changed to switch between a function as an electronic program guide relative to broadcast programs in all channels or a particular channel and a function as an electronic program guide relative to recorded programs in all video cassettes or a particular video cassette which has been recorded by the VTR 11.

Each of the four navigate modes can be selected by selecting a certain command item in a command window W2, described later on, and performing a certain operation.

When the "command key" is operated in the MAIN mode of the EPN mode, the MAIN mode switches to the COMMAND mode as shown in FIG. 2. In the COMMAND mode, a COMMAND window W2 is displayed in addition to the MAIN window W1. The COMMAND mode is a mode for executing certain designating operations for the EPN. The COMMAND window W2 displays therein various command items for such designating operations.

In the COMMAND mode, as shown in FIG. 2, the MAIN window W1 is shown hatched, and the COMMAND window W2 is shown blank, representing that some display is being made to indicate that the COMMAND window W2 is an active window.

When a certain operation item is selected and the "EXE key" is operated while in the COMMAND mode of the EPN mode, the COMMAND mode switches to the INPUT mode, as shown in FIG. 2. In the INPUT mode, an INPUT window W3 is displayed in addition to the MAIN window W1 and the COMMAND window W2. In this case, the INPUT window W3 is an active window.

The INPUT mode is a mode for entering required parameters belonging to the operation item designated in the COMMAND window W2, for example. The INPUT window W3 displays an image therein for entering such parameters.

When the "EXE key" is operated after the parameters are properly entered in the INPUT mode, the INPUT mode switches to the COMMAND mode.

When the "EPN key" is operated in whatever mode of the EPN mode, the EPN mode returns directly to the normal mode.

(3. Management of recorded program information):

(a. Program identification information recorded on a magnetic tape):

An arrangement for managing recorded program information in this embodiment will be described below. In this embodiment, "recorded program information" is totally referred to as a tape library data stored in the tape library memory 10a and a program identification information to be recorded on a magnetic tape. First the program identification information will be described below. The program identification information is arranged as data to be recorded on a magnetic tape for associating the tape library data and programs actually recorded in the video cassette.

Figures 3A, 3B:
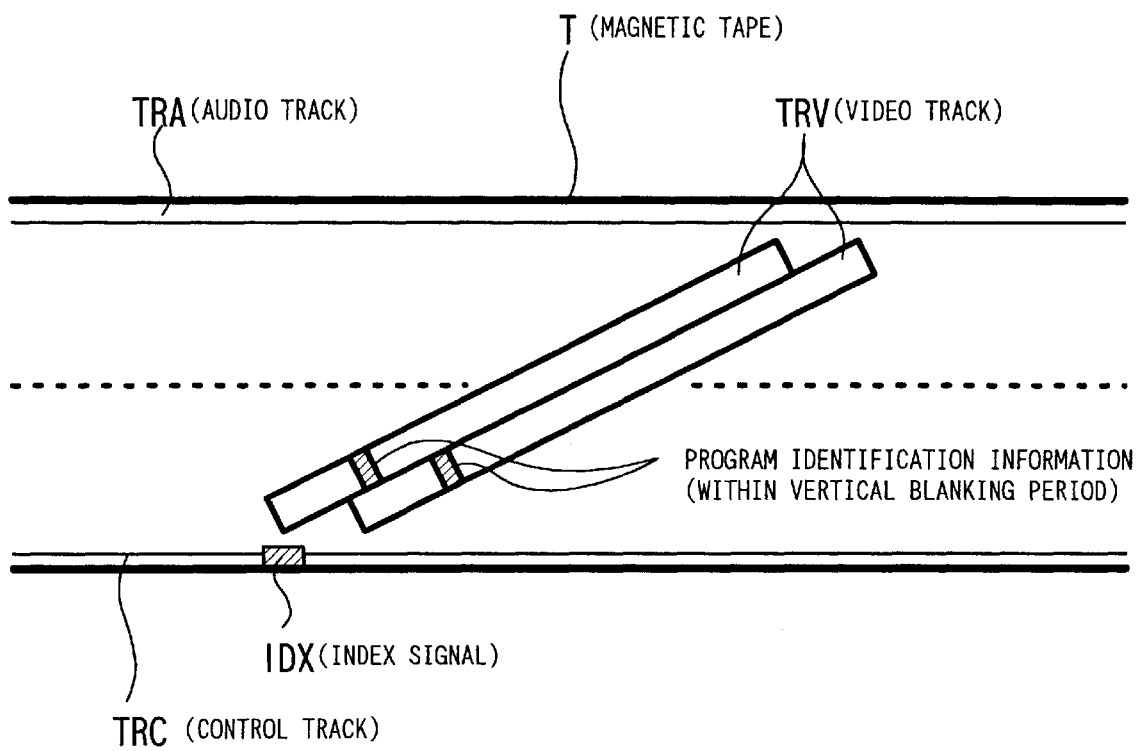
FIGS. 3A and 3B are diagrams illustrative of a recording format of program identification information on a magnetic tape.

FIG. 3A conceptually shows an example of a recording format on a magnetic tape T in the VTR 11 according to the embodiment.

As shown in FIG. 3A, an audio track TRA on which an audio signal is recorded is formed along an upper edge of the magnetic tape T by the audio signal recording/playback head HA, which is a fixed head, in the recording mode. Video tracks TRV on which a video signal is recorded are formed obliquely successively on the magnetic tape T by the video signal recording/playback head HV, which is a rotating head, during helical scan in the recording mode. A control track TRC in which a control signal is recorded is formed along a lower edge of the magnetic tape T by the control head HC, which is a fixed head.

In this embodiment, data of program identification information is recorded in given horizontal lines (for example, lines 10–20) in a vertical blanking period of the video signal. Therefore, program identification information is recorded in portions of the video tracks TRV which correspond to the given horizontal lines in the vertical blanking period. An index signal IDX indicative of a recording start position is recorded in the control track TRC in a region corresponding to a position where the recorded program starts. The index signal IDX is recorded under the control of the system controller 9.

The program identification information is data which plays a role of an index, and has its contents as shown in FIG. 3B.

FIG. 3B shows a data structure of program identification information recorded on the magnetic tape T. In this embodiment, as shown in FIG. 3B, the data structure of program identification information comprises a tape number area for storing identification data of a tape number, a program number area for storing identification data of a program number, and a data area for storing data such as address data.

In this embodiment, the program number is set so that numbers of sequential numbers in an ascending order such as [1] to [n] should be allocated to recorded programs recorded by the VTR unit 11. Specifically, different numbers are allocated to all recorded programs. Therefore, by referring to the program numbers, it is possible to specify one recorded programs of all the recorded programs which have been recorded by the VTR unit 11. The maximum number of the program numbers which can be set, i.e., the maximum value of the number [n] may be optionally set depending upon actual use conditions, the number of bits which can be allocated to each information, and so on.

Address data in the data area is data indicative of information, in the form of times, of recording start/end positions on magnetic tapes. If necessary, the data area may contain other types of data in addition to the address data. By referring to this address data, it becomes possible to identify a recording start/end position and a recording time length on the magnetic tape.

(b. Data contents of a tape library memory):

The contents of tape library data stored in the tape library memory 10*a* will be described below with reference to FIGS. 4A and 4B.

Tape library data are formed of recorded program data blocks DB each representing information of a recorded program. The contents of each recorded program data block can be generated as a recorded event based on the EPN data of a broadcast program to be recorded, by the system controller 9 when the program is recorded by the VTR unit 11.

The structure of each of the recorded program data blocks are shown in FIG. 4A. As shown in FIG. 4A, a recorded program data block DB comprises a program number area A1 for storing data of the program numbers allocated to the respective recorded programs, and a data area A2 for storing required information (program guide data) relative to the recorded program.

Specific contents of the program guide data to be stored in the data area A2 are not described in detail here. However, for recording a broadcast program, it is possible to generate various items of information including the title of the program as program guide data based on electronic program guide information relative to the broadcast program.

The program guide data include the address data described above with reference to FIG. 3B. Therefore, the data of the recording start/end positions and the length of a recording time of a recorded program on a magnetic tape may be included as information of the program guide data.

FIG. 4B is a diagram showing an example of mapping a tape library data in the tape library memory 10*a*.

The tape library data employs a data mapping arrangement in which storage areas for storing the recorded program data blocks DB shown in FIG. 4A are provided so as to correspond to "tape number" in the row direction and "program number in tape" in the column direction.

The "tape number" prescribed in this figure is set as the number to be allocated so as differ from one another with respect to the recorded video cassettes. Specifically, the tape number serve as information for specifying individual video cassettes in where the recorded programs are recorded.

The pate number is set with respect to the video cassette loaded onto the VTR unit 11 when a program is recorded by the VTR unit 11. In principle, the tape number is set so that, every time when a virgin tape is recorded by the VTR unit 11, the tape numbers should be automatically and successively assigned to the loaded virgin tape in an ascending order such as 1 to n. If necessity is caused, it is possible for a user to optionally set the tape number which has never been used to make the set tape number correspond to the virgin tape to be recorded.

While it is desired that the maximum value of the tape number [n] which can be set is as much as possible, the maximum value may optionally be set depending upon conditions such as a storage capacity of the tape library memory 10*a* or the like.

The "program number in tape" is different from the above "program number", being a program number corresponding to recorded programs in the recording order with respect to each of the video cassettes to which the tape numbers are assigned. As shown in the "program number in tape" 1 to n are determined with respect to each of rows of the tape numbers as shown in FIG. 4B. The maximum values the program number [n] in tape which can be set may also be optionally set in consideration of the number of programs which can be recorded in one video cassette.

The tape library data according to this embodiment is formed such that the recorded program data blocks DB of each of the recorded programs should be properly stored in the storage areas corresponding to a matrix formed of rows of the tape numbers [1] to [n] and the numbers in tape [1] to [n] determined as described above.

(c. Correspondence of recorded state of recorded program to tape library data)

Contents of the recorded programs actually recorded on the magnetic tape of the video cassette and contents of the tape library data generated in correspondence therewith will be described as a recorded state of the recorded programs with reference to FIG. 5, by way of example.

Figure 5A:
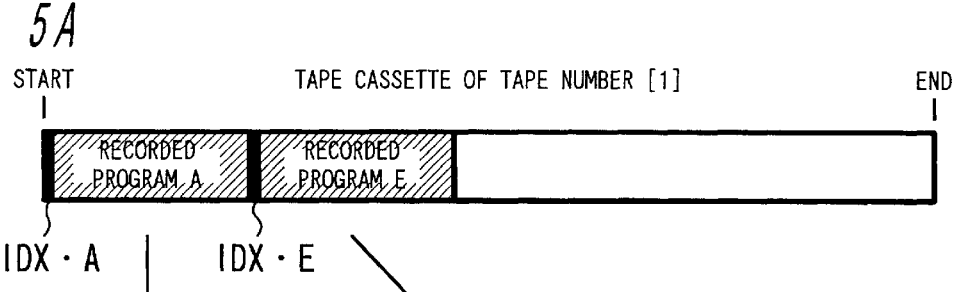
FIGS. 5A through 5E are diagrams illustrative of an example of correspondence of recorded contents of a recorded program recorded on a magnetic tape to contents of a program identification information and a tape library data.

FIG. 5A shows a recorded state of the video cassette for which the tape number [1] is set. In the magnetic tape of the video cassette of the tape number [1], a recorded program A is recorded from its tape start position and a recorded program E is recorded at the succeeding portion.

Figure 5B:
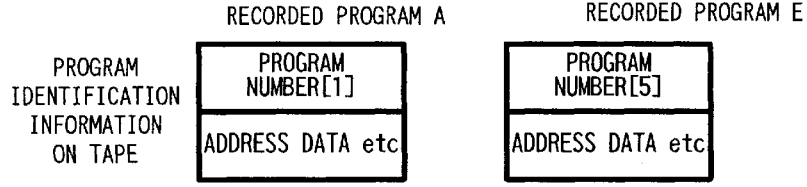

It is assumed that program number identification data as contents of program identification information recorded on the tape with being superposed on the video signal of the recorded programs A and E are recorded thereon as shown in FIG. 5B.

In this case, it is assumed that the program number [1] is assigned to the recorded program A and an identification data indicative of the program number [1] is recorded on a magnetic tape and that the program number [5] is assigned to the recorded program E and an identification data indicative of the program number [5] is recorded on the magnetic tape.

Specifically, assignment of the program number [1] to the recorded program A means that the recorded program A is the first recorded program among the recorded programs which have been recorded on the video cassette by the VTR unit 11. Assignment of the program number [5] to the recorded program E means that the recorded program A is the fifth recorded program recorded thereby.

Data such as address data or the like as the program identification information of the recorded programs A and E are recorded with the data of contents corresponding to actual recording positions of the respective recorded programs on tapes and specific contents of the recorded programs being produced.

Figure 5C:
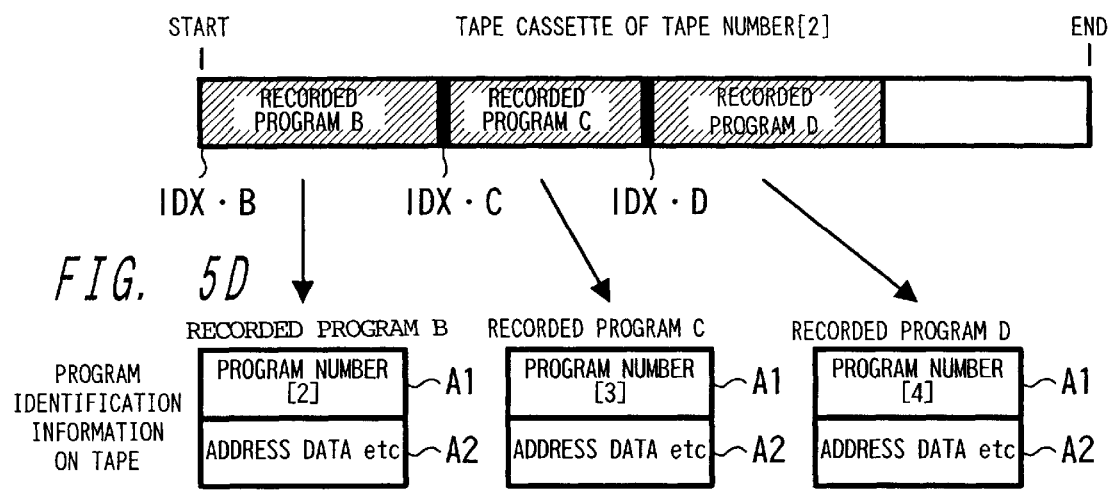

FIG. 5C shows a recorded state of a video cassette to which the tape number [2] is assigned. The recorded programs B, C and D are successively recorded on the magnetic tape of the video cassette from the tape start position as shown in FIG. 5C.

Figure 5D:
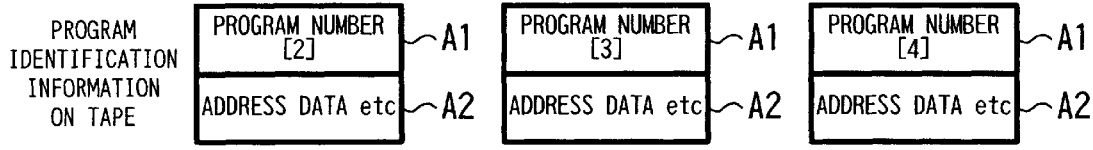

In this case, of the programs which have been recorded by the VTR unit 11, the recorded programs B, C and D are set as the second, third and fourth recorded programs, respectively. Therefore, as shown in FIG. 5D, the values indicative of the program numbers [2], [3], [4] are respectively recorded as the identification data program number of the program identification information with respect to the recorded program B, the recorded program C and the recorded program D.

Figure 5E:
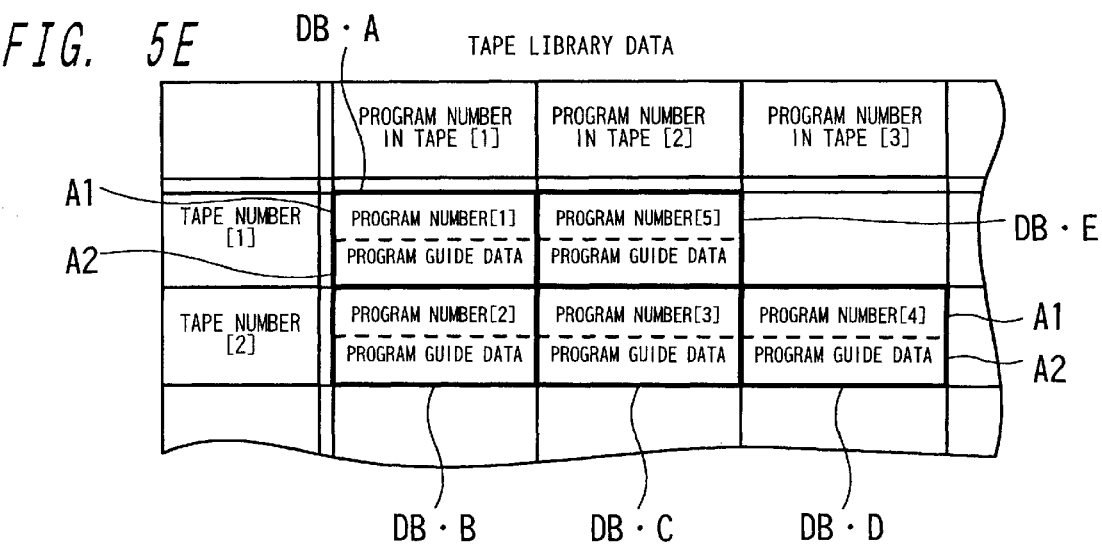

Contents of the tape library data corresponding to the video cassette of the tape number [1] and the video cassette of the tape number [2] having the above recorded contents becomes ones shown in FIG. 5E.

FIG. 5E shows a state in which respective recorded program data blocks (whose data structure is shown in FIG. 4A) of the recorded programs A to E are allocated to and stored in proper data block storage areas on the tape library data so as to correspond to respective recording results.

As shown in FIG. 5E, the recorded program data block DB·A of the recorded program A is stored as information about the recorded program recorded on the video cassette of the tape number [1], in the storage area corresponding to (tape number [1]/program number [1] in tape), and the recorded program data block DB·E is stored in the storage area corresponding to (tape number [1]/program number [2] in tape).

In this case, the identification data indicative of the program number [1] is stored in a program number area A1 of the recorded program data block DB·A of the recorded program A so as to correspond to the contents of the program identification information. Similarly, the identification data indicative of the program number [5] is stored in a program number area A1 of the recorded program data block DB·E of the recorded program E.

In the data block storage areas of a row corresponding to the tape number [1], any recorded program data block DB is not stored in storage areas corresponding to the number larger than the program number [3] in tape in response to the actual recording results of the video cassette of the tape number [1].

As the recorded programs recorded on the video cassette of the tape number [2], the recorded program data block DB·B is stored in a storage area for (tape number [2]/ program number [1] in tape), the recorded program data block DB·C is stored in a storage area for (tape number [2]/program number [2] in tape), and the recorded program data block DB·D is stored in a storage area for (tape number [2]/program number [3] in tape).

The identification data indicative of the program number [2] is stored in a program number area A1 of the recorded program data block DB·B of the recorded program B so as to correspond to the contents of the program identification information. Similarly, the identification data indicative of the program number [3] is stored in a program number area A1 of the recorded program data block DB·C of the recorded program C, and the identification data indicative of the program number [4] is stored in a program number area A1 of the recorded program data block DB·D of the recorded program D.

The program data corresponding to the program contents of the respective recorded programs A to E are stored in the respective data areas A2 of the above recorded program data blocks DB·A to DB·E.

(d. Example of recorded program information constructed upon recording operation)

There will be described with reference to FIGS. 6A and 6B, by way of example, an operation for constructing recorded program information (program identification information and tape library data) corresponding to the recorded programs recorded on a video cassette as described with reference to FIGS. 5A to 5E. This operation is carried out every time when the VTR unit 11 records a program.

An operation shown in FIGS. 6A and 6B is carried out on the assumption that the recorded program E is recorded on the same video cassette having the tape number [1] as that shown in FIG. 5A successively from a position where the recorded program A.

In this case, it is assumed that a program A has already been recorded in a video cassette allotted a tape number [1] shown in FIG. 6A, from a start position to a position indicated by the arrow a. In this embodiment, an index signal IDX is recorded in the control track at the recording start position, as described above. In FIG. 5A, an index signal IDX·A indicative of the recording start position for the recorded program A has been recorded.

In this case, the contents of the program identification information of the recorded program A are those described with reference to FIG. 5B. Since the recorded program E is not recorded in view of the contents of the tape library data in this state, in view of the contents of the tape library data shown in FIG. 5E, a data block storage area of (tape number [1]/program number [2] in tape) is set in its blank state in which no recorded program data block is stored therein.

At this point, the recorded programs B, C, D are already recorded in the video cassette of the tape number [2], and hence the row of the tape number [2] in the tape library data is similar to that shown in FIG. 5E.

When the user loads the video cassette into the VTR 11 in order to record a new program, it is assumed that the video cassette is loaded with the tape position indicated by the arrow a, i.e., the recording end position for the recorded program A, being positioned at the recording head.

Before starting to record newly the recorded program E, in this embodiment, the VTR slightly rewinds (or fast-forwards) the video cassette and plays back the video cassette for a short time (e.g., a few seconds) for thereby detecting the program identification information of the last one (in this case, the recorded program A) of any programs that have already been recorded.

As described above, the contents of the program identification information of the recorded program A are the contents shown in FIG. 5B, and the value of [1] is recorded as the identification data value of the program data.

With reference to the identification data of the above program number [1] detected as the program identification information of the recorded program A and the current tape library data, the system controller 9 identifies the tape number assigned to the video cassette which is being loaded onto the VTR unit 11. In this case, since, as shown in FIG. 5E, the recorded program data block DB·A of the recorded program A where the identification data of the program number [1] is stored in the storage area of (tape number [1]/program number [1] in tape), it is determined that the tape number [1] has already been allocated to this video cassette.

The system controller 9 recognizes the program number to be assigned to the recorded program E to be recorded, with reference to the current tape library.

In this case, since the recorded program having the maximum program number among the recorded programs whose recorded program data blocks DB are stored in the tape library data is the recorded program D whose recorded program data block DB·D is stored in the storage area of (tape number [2]/program number [3] in tape) and the program number thereof is [4], the system controller recognizes that the program number [5] should be assigned to the recorded program E. If the tape library data is arranged so as to keep the information about the maximum value among the program numbers which have been set, reference to this maximum value information allows the program number of the program newly recorded to be set.

As described above, the system controller recognizes the tape number of the video cassette on which the recorded program E is to be recorded, and after the program number to set is assigned to the recorded program E, as shown in FIG. 6B, a recording operation of the recorded program B is started from a position indicated by an arrow a.

In this case, the index signal IDX is recorded on the control track at the recording start position of the recorded program E. Thereafter, in the recording operation, video signals and audio signals of the recorded program E are recorded. The identification data indicative of the program number [5] and required data such as address data or the like are recorded as the program identification information with being superposed on predetermined lines in a vertical blanking period of the video signal.

When the recording operation of the recorded program E is finished as described above, the system controller creates the recorded program data block DB·E of the recorded program E.

At this time, the identification data indicative of the program number [5] is stored in the program number area A1 of the recorded program data block DB·E. If the recorded program E is inherently a broadcasting program received by the tuner 2, then a program guide data of the data area A2 is created by using data of contents concerning the recorded program E of the electronic program guide data transmitted with being superposed on a broadcasting signal.

If the address data is included in the program guide data, then information such as recording start/end positions on tape with respect to the recorded program B, a recording time or the like can be contained in the program guide data.

The recorded program data block DB·E of the recorded program E created as described above is stored as the data of the recorded program E recorded next to the recorded program A in the recording order, in the storage area of (tape number [1]/program number [2] in tape). Thus, the tape library data having the same contents as shown in FIG. 5E can be obtained.

The electronic program display control apparatus according to this embodiment can display information relative to programs recorded so far in video cassettes in the EPN mode, as shown in FIG. 2, based on tape library data created as described above. For example, it is naturally possible to display the information concerning the recorded programs in an order of the recording with respect to each video cassette.

Specific display forms of recorded program information in the EPN mode are omitted from illustration because there are various display forms.

(e. Example of a process of cueing up and playing back a tape using recorded program information)

Figure 7:
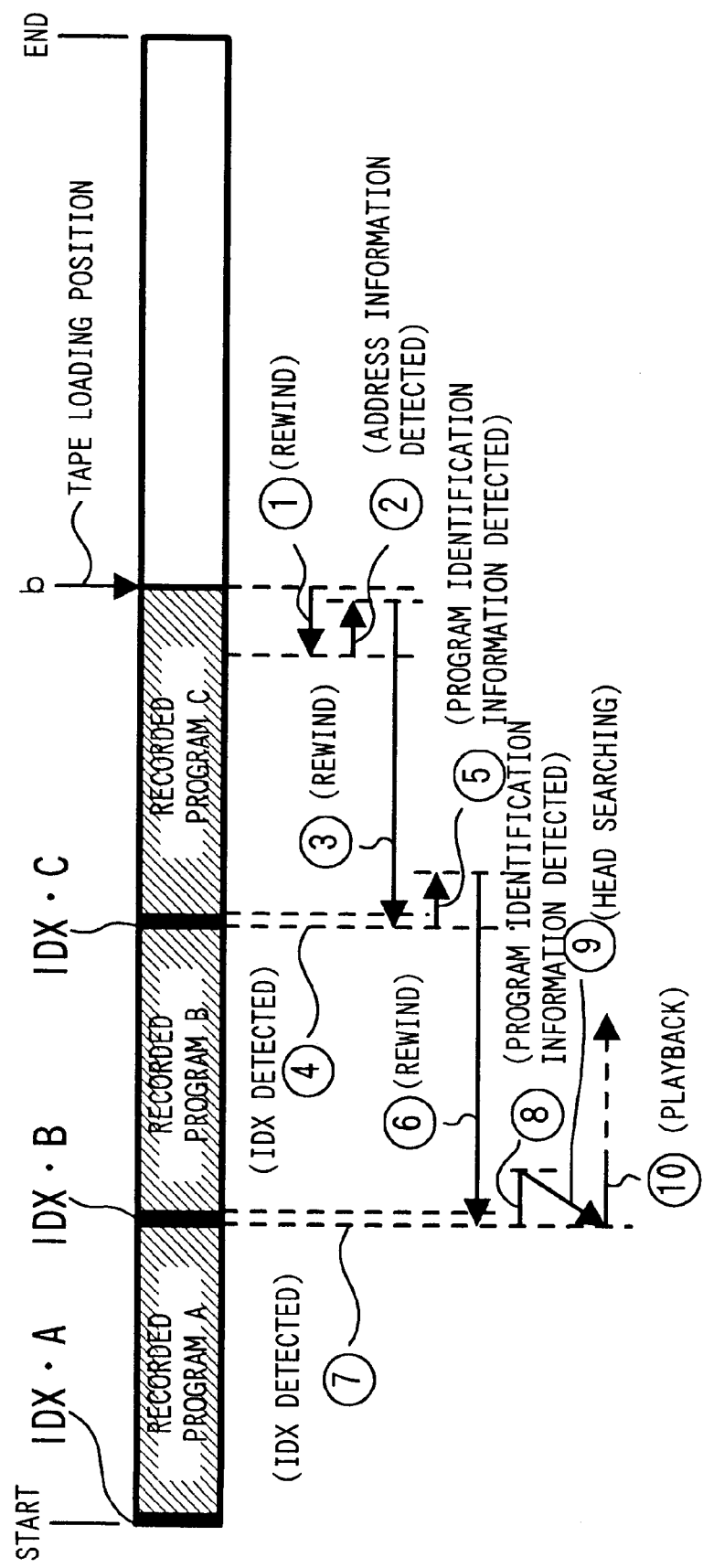
FIG. 7, is a diagram illustrative of an example of a process of cueing up and playing back a magnetic tape in the embodiment.

A process of cueing up and playing back a tape in the VTR 11 in this embodiment using recorded program information (program identification information and tape library data) described above will be described below with reference to FIG. 7. FIG. 7 shows the manner in which a desired recorded program is selected on the basis of an EPN image and the tape is cued up and played back.

In FIG. 7, three programs A, B, C are successively recorded on a cassette tape from a tape start position. Tape numbers in the program identification information and tape library data of the recorded programs A, B, C are of a common value (e.g., a tape number [1]), and program numbers are set to values of [1], [2], [3] for the respective recorded programs A, B, C. The tape number assigned to the video cassette where the recorded programs A, B, C is [1]. In the tape library data, the recorded program data blocks DB of the recorded programs A, B, C are respectively stored in the storage areas of (tape number [1]/program number [1] in tape), (tape number [1]/program number [2] in tape) and (tape number [1]/program number [3] in tape).

For example, the user switches to the MAIN mode in the EPN mode through an operation described above with reference to FIG. 2 and displays the MAIN window W1. The user then selects the [all tape navigate] mode or the [this tape navigate] mode, for thereby displaying the information relative to programs which have been recorded so far by the VTR 11. It is assumed that a desired program which the user wants to see is the program B recorded in the video cassette shown in FIG. 6. The user searches for the recorded program B in the MAIN window W1, using arbitrary search items. The user refers to the tape number of the video cassette which is displayed in the MAIN window W1 and in which the program B is recorded, and loads the tape that is allotted the tape number into the VTR 11. It is assumed that the tape is loaded with the tape position indicated by the arrow b in FIG. 6 (the end position of the recorded program C) being positioned at the playback head.

After the user selects the recorded program B in the MAIN window W1 in the EPN mode through a certain operation, the user switches to the COMMAND mode, and carries out an operation to cue up and play back the tape in the COMMAND window.

Based on the above operation, the system controller 9 controls the VTR 11 to cue up and play back the tape to reproduce the recorded program B according to steps 1–10 described below.

Step 1: The VTR 11 rewinds the tape a predetermined length from the loaded tape position.

Step 2: The VTR 11 plays back the tape a short time (e.g., a few seconds) from the position where the rewinding of the tape is finished, to extract program identification information and hence refer to address data at least among program identification information. When the address data is referred to, a present tape position is identified. By comparing the present tape position and the recording start position information of the recorded program B which has been stored in the tape library data, the direction in which to transport the tape is determined for cueing up the recorded program B. In this case, the direction in which to transport the tape is the direction in which the tape is rewound.

Step 3: While rewinding the tape, detection of an index signal IDX recorded in the control track is awaited.

Step 4: First, an index signal IDX·C of the recorded program C is detected.

Step 5: When the index signal IDX·C is detected in the step 4, the VTR plays back the tape for a short time to extract the program identification information of the recorded program C. The system controller 9 compares the identification data of the program number in the program identification information of the recorded program C with the identification data of the program number in the tape library data (the recorded program data block DB) of the recorded program B to be cued up. As a result, the system controller 9 decides that the compared data are not in conformity with each other.

Step 6: When the compared data are not in conformity with each other, the VTR 11 further rewinds the tape, waiting for a next index signal IDX to be detected.

Step 7: An index signal IDX·B of the recorded program B is detected.

Step 8: The VTR 11 plays back the tape for a short time from the position of the index signal IDX·B to extract the program identification information of the recorded program B. The system controller 9 compares the extracted program identification information of the recorded program B with tape number and program number data in the tape library data (the recorded program data block DB) of the recorded program B. The system controller 9 now decides that the compared data are in conformity with each other.

Step 9: The VTR 11 rewinds the tape by the length which has been played back in the step 8, feeding the tape to the start position of the recorded program B.

Step 10: The VTR 11 plays back the recorded program B.

According to the data management state on the tape library memory of this embodiment, since the tape number of the video cassette where the recorded program is recorded can be recognized from the identification data of the program number, by using the tape number of the program identification information detected in the step 2, it is possible to identify which tape number in the tape library memory the recorded program of the tape number corresponds to. For example, if a cue-up and playback request is issued while a video cassette in which a program to be cued up and played back is not recorded is being loaded, then it is possible to decide that the program to be cued up and played back is not recorded in the presently loaded video cassette.

If aa cue-up and play-back operation is requested in as state that a video cassette storing no recorded program to be cued up and played back is loaded, in the step 2, it can be determined that the video cassette currently loaded is not proper. Without carrying the cue-up and play-back operation, it is possible to output and display a message asking a user to load the vide cassette storing the recorded program to be cued up and reproduced.

In this embodiment, as described above, since program information relative to recorded programs is stored in the tape library memory 10*a*, a guide for recorded program information can be displayed without the need for loading a video cassette and playing back its recorded program area.

Program numbers are recorded on magnetic tapes to identify at least recorded programs, and program guide information relative to the recorded programs are stored in association with the tape numbers assigned to each video cassette in the tape library memory 10*a*. Therefore, by comparing the tape numbers and the program numbers on magnetic tapes and in the tape library data memory 10*a*, it is possible to cut up and play back a program selected by the user, as described above with reference to FIG. 6.

(4. Reconstruction process for recorded program information)

Inasmuch as a video cassette physically records information magnetically on the magnetic tape longitudinally therealong, if a plurality of programs are recorded in a single video cassette and recorded program information (program identification information and recorded program data block DB) is generated, recorded on the magnetic tape, and stored in the tape library memory 10*a*, then different tape numbers may possibly be assigned to those programs recorded on the single magnetic tape.

A reconstruction process for recorded program information according to this embodiment is to reconstruct the registration of different program numbers assigned to plural recorded programs in one video cassette so that these tape numbers of the recorded programs will uniformly be handled. A situation in which different program numbers are registered in a single cassette will be described below with reference to FIGS. 8A through 8D.

FIG. 8A shows a state that only the recorded program A is recorded from a tape start position of a video cassette. The video cassette shown in FIG. 8A has the same recorded state as that shown in FIG. 6A. Therefore, the tape number [1] is currently assigned to this video cassette. The program number [1] is assigned to the recorded program A, and the identification data of the program number [1] as the program identification is recorded.

A history of the recording operation of the VTR unit 11 which have already been carried out until this point are the same as that shown in FIG. 6A. Therefore, the contents of the tape library data has a blank portion of (tape number [1]/program number [2] in tape) in the contents shown in FIG. 5E.

It is assumed that the magnetic tape has been transported for some reason from the end position of the recorded program A to the position indicated by the arrow c in FIG. 8A. When the video cassette is loaded into the VTR 11, the position indicated by the arrow c is the loaded tape position, with a blank tape area being present between the end position of the recorded program A and the loaded tape position.

For recording a new program in the video cassette, the VTR 11 operates to rewind the tape a predetermined length from the position indicated by the arrow c to detect the program identification information of the previously recorded program.

The blank tape area has a width (tape length) greater than the length by which the tape is rewound. Therefore, as shown in FIG. 8A, the blank tape area is played back to detect program identification information, but no program identification information is detected as a matter of course.

When no program identification information is detected, the system controller 9 regards the video cassette as a virgin tape, and establishes a tape number different from the tape number [1] with respect to a program B (see FIG. 8B) to be recorded next. In this case, a tape number [2] is established.

In this case, the program number [5] is assigned to the recorded program E similarly to the program numbers shown in FIGS. 5 and 6.

Since the recording operation is carried out as described above after the corresponding tape number and the corresponding program number is assigned to the recorded program E, the recorded program E is recorded as shown in FIG. 8B in this case.

As a result, the respective program identification informations of the recorded programs A and E recorded on a magnetic tape have the contents shown in FIG. 8C. The recorded program data block DB·E created with respect to the recorded program E is stored in the storage area of (tape number [3]/program number [1] in tape) in the tape library memory as shown in FIG. 8D.

While the programs A, B are recorded in the same video cassette, they are handled as recorded programs having different tape numbers according to the tape library data. Thus, the programs A, B are managed as being recorded in different video cassettes. When the recorded program information is displayed in the EPN mode, the recorded programs A, B are displayed as programs recorded in respective video cassettes having respective tape numbers [1], [3].

Such inconformity between the physically recorded state of programs in video cassettes and the managed state per video cassette of the recorded program information in the electronic program guide display apparatus will result in impairing the ease with which an electronic program guide is used with respect to the recorded programs.

According to this embodiment, the reconstruction process for recorded program information is carried out as described below with reference to FIG. 8 to unify tape numbers for recorded programs that are allotted different tape numbers in a single video cassette, so that those recorded programs can be managed by tape library data as programs recorded in one video cassette.

FIG. 9A illustrates the reconstruction process for recorded program information. In FIG. 9A, programs are recorded in a video cassette in the same manner as the programs recorded in the video cassette as shown in FIG. 8B. The program identification information of the programs A, E recorded on the tape and the contents of the tape library data are the same as those shown in FIGS. 8C and 8D.

Video cassettes which need the reconstruction process to be carried out thereon are identified as follows: When the user sees a program table in an EPN image, the user may notice that the allocation of a tape number to a certain program differs from the user's memory, and recognize the need for the reconstruction process. Alternatively, the system controller of the apparatus may recognize the need for the reconstruction process based on the contents of program identification information per recorded program which is extracted when a scanning process such as a cue-up and playback process is carried out. For example, if the apparatus decides that a video cassette needs the reconstruction process to be carried out thereon, then the apparatus may automatically execute a series of steps of the reconstruction process as described below, or may display an alert message for prompting the user to start the reconstruction process. In the latter case, the user operates a remote controller of the like to execute the reconstruction process to reconstruct recorded program information.

For effecting the reconstruction process shown in FIG. 9, the user first loads a video cassette which the user wants to be reconstructed with respect to recorded program information, into the VTR unit 11. It is assumed that the video cassette is loaded with the tape position indicated by the arrow d in FIG. 8A (the end position of the recorded program B) being positioned at the playback head. When the user carries out a certain operation to execute the reconstruction process, the system controller 9 thereafter operates to effect steps 1–8 shown in FIG. 8A to execute the reconstruction process. In this case, the reconstruction process is executed with a tape number [1] established for the tape cassette.

1. Since the loaded tape position is a certain position on the tape in the video cassette (the position indicated by the arrow d), the video cassette is rewound to the tape start position.

2. A process of successively detecting index signals IDX of the recorded programs is started while the tape is being fed fast forward from the tape start position. In this case, an index signal IDX·A of the recorded program is immediately detected substantially at the tape start position.

3. After the index signal IDX·A is detected, the recorded program A is played back for a short time to extract program identification information superimposed upon its video signal.

While the identification data of the program number as the program identification information recorded with being superposed on the video signal of the recorded program A is [1], the system controller 9 searches for the recorded program data block DB where the program number coinciding with the program number or the program identification information is stored, on the tape library data. In this case, the recorded program data block DB·A stored in the storage area of (tape number [1]/program number [1] in tape) is searched for.

The system controller 9 stores the recorded program data retrieved as described above in the storage area in the row of the tape number [1] by shifting the data from its original position in an order of the program numbers in tape. In this case, since the recorded program data block DB·A is already stored in the storage area of (tape number [1]/program number [1] in tape), the storage position of the recorded program data block DB·A is not moved in this case.

4. After the step 3, the tape is fed fast forward to search for a program physically recorded on the tape next to the recorded program A.

5. An index signal IDX·B of the recorded program B is detected as indicating the program B recorded next to the recorded program A.

6. The recorded program B is played back for a short time to extract program identification information superimposed upon its video signal, thereby obtaining the identification data (program number [5]) of the program number of the recorded program E in the program identification information.

The system controller 9 searches for the recorded program data block DB·E stored in the storage area of (tape number [3]/program number [1] in tape) as the recorded program data block coinciding with the program number of the recorded program E in the program identification information, and then moves the recorded program data block DB·E to the storage area of (tape number [1]/program number [2] in tape) to store the same therein. Thus, the contents of the tape library data are changed from the contents shown in FIG. 8D to the contents shown in FIG. 9B. In this state, the storage area of (tape number [3]/program number [1] in tape) becomes a blank area.

7. After the step 6, the tape is fed fast forward to search for a program physically recorded on the tape next to the recorded program B.

8. In this case, no recorded program exists after the recorded program B. No new index signal IDX is detected, and the tape is fed fast forward up to the tape end position. When the fast-forward feeding is stopped, the reconstruction process comes to an end. Specifically, an operation of scanning the recorded program recorded on the video cassette is finished, and accordingly the reconstruction processing is finished.

After the step 8, the tape may automatically be rewound to its leading position, whereupon the reconstruction process may be finished.

Since the reconstruction processing is thus carried out and the contents of the tape library data becomes that shown in FIG. 9B, thereafter the recorded programs A and E are treated as the recorded programs recorded on the same video cassette also in view of the management of the tape library memory, and they are managed so that the recording order thereof should be matched with the state that they are actually recorded on the video cassette.

Also in the recorded program guide display according to EPN, thereafter the recorded programs A and E are treated as the recorded programs recorded first and second in the video cassette of the tape number [1].

According to another reconstruction process different from the reconstruction process in the present embodiment, when it is found that there is a recorded program which is allotted a tape number different from that of the video cassette in which the program is actually recorded, information such as of tape and program numbers that is newly produced by a correction may additionally be stored in a storage area of the same group which stores original tape and program numbers recorded when the program was recorded, and link information may be established and held for linking an address of the storage area which stores the new tape and program numbers and an address of the storage area which stores the original tape and program numbers to each other. In this data management scheme, the data are managed for reconstruction depending on the above link information.

Therefore, if data of one program are reconstructed over and over again because, for example, programs are recorded many times in a superimposed fashion in a single video tape, then the number of storage areas that are linked by link information is so large that the memory management will be burdensome. Inasmuch as the addresses are interlinked by the link information, information about tape and program numbers prior to the latest reconstruction process, which would otherwise be unnecessary, is not erased or rewritten, but continuously held, consuming a memory capacity. Under certain conditions, therefore, a memory of relatively large capacity may be required.

However, since in this embodiment recorded programs are identified by using only program numbers (only program numbers are recorded as the identification data on a video tape) and further each of the recorded programs specified by the program numbers are managed by using the tape numbers and the program numbers in each tape in the tape library memory, the processing of managing a memory becomes comparatively simplified even upon a normal processing.

In the reconstruction processing, since the data block of a recorded program to be reconstructed is rewritten by changing its storage position so that the storage position should be matched with a position where the program is actually recorded on a video tape, even if one program are subjected to the reconstruction processing twice or more, then an amount of the processing of managing the reconstructed recorded programs is prevented from being increased. Moreover, since the in the reconstruction processing the memory contents (change of the storage position of the data block DB) described above is successively carried out, a memory capacity is prevented from being used suddenly, and hence the storage capacity for the tape library data is effectively utilized.

Figures 10A, 10B:
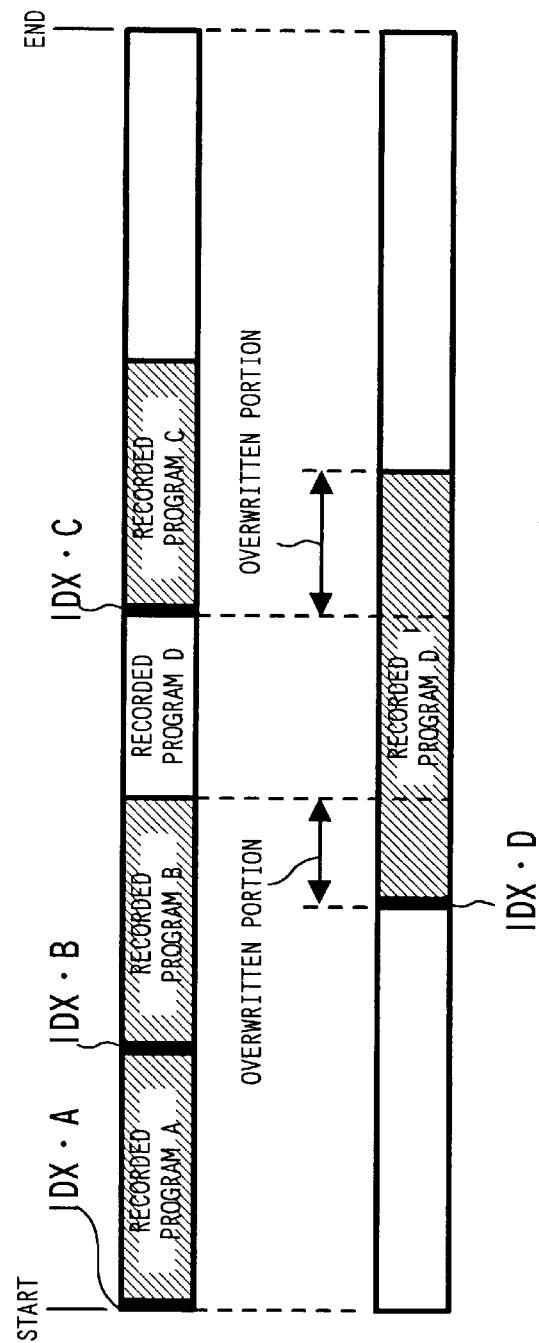
FIGS. 10A and 10B are diagrams illustrative of the manner in which a recorded program partly overwritten on a magnetic tape is handled when the reconstruction process is carried out.

FIG. 10A shows programs A, B, D, C recorded successively on the magnetic tape in a video cassette from the tape start position. As shown in FIG. 10B, the recorded program D has front and rear portions erased by being overwritten by the recorded programs B, C.

When programs are subsequently recorded so as to overwrite a recorded program, such as the recorded program D, the user knows in most cases that the recorded program D is erased. Therefore, it can be assumed that the recorded program D is no longer necessary for the user. It is preferable from the standpoint of actual video cassette use that the unnecessary recorded program be deleted from the data management for recorded program information and not displayed in the EPN.

In this embodiment, the reconstruction process may be carried out on such a video cassette thereby to delete the unnecessary recorded program D shown in FIG. 10A from the data management.

In this case, an index signal IDX·D of the recorded program D has been erased by being overwritten by the recorded program B, and does not exist in the recorded state of the video cassette shown in FIG. 10A.

If the reconstruction processing is effected on the video cassette in accordance with the process described with reference to FIG. 9, when the tape is fed fast forward for scanning the recorded programs, the index signal IDX·D of the recorded program D is not detected. Therefore, in the reconstruction processing, the recorded program data block DB of the recorded program D is not stored in the storage area corresponding to the tape number of the video cassette shown in FIG. 10A.

Therefore, in the data management referring to the tape library data after the reconstruction process, the recorded program D is handled as being not recorded on the video cassette, and information relative to the recorded program D is not displayed in the EPN.

As described above, the present invention employs as a management form of recorded programs for displaying a program guide a method of recording only the identification data of the sequential program number on the tape-like recording medium with being superposed on the video signal and of then storing the program informations of the recorded programs specified based on the tape numbers in the storage areas designated by the tape number set in accordance with the recording history. In comparison with the form of managing the recorded program information, it becomes possible to simplify the management of the recorded program information on the memory by handling set tape numbers and program numbers associated therewith as the program identification information. Even in the reconstruction processing, since it is sufficient to rewrite the guide information data corresponding to the program number of the reconstructed recorded programs by changing its storage position so that the position should be matched with the recording results on the video tape, the processing concerning the memory management upon the reconstruction processing and its succeeding processings becomes simplified.

When program guide information is presented on the basis of program information that has been managed by the reconstruction process according to the present invention, the user is provided with guide information in conformity with an actual state in which the programs are recorded in the video cassette. Consequently, the program guide information can efficiently be used as a recorded program guide function.

The present invention is not limited to the details of the embodiment, but may be modified in various ways. For example, the steps of the cue-up and playback process and the reconstruction process shown in FIGS. 6 and 8A–8C may be modified otherwise.

The EPN displayed as the program guide is not limited to the details shown in FIG. 2, but may be modified to have various other details.

What is claimed is:

1. A recorded program information managing apparatus for managing information concerning a recorded program recorded on tape-like recording medium, comprising:

recorded program information setting means for setting as recorded program information a recording medium number information indicative of different recording medium numbers assigned to tape-like recording media where at least recorded programs are recorded and a program number information indicative of different program numbers assigned to recorded programs;

recording control means for recording at least said program number information as a recorded program identification information on a tape-like recording medium by superimposing said program number information on a video signal of the recorded program;

storage means for storing said program number information as recorded program information concerning respective recorded programs recorded on the tape-like recording medium so that said program number information should correspond to said recording medium number information assigned to the tape-like recording medium where a recorded program to which the program number information assigned is recorded; and reconstruction means for, if said storing means stores program number information of recorded programs recorded on the same tape-like recording medium in correspondence with different recording medium number information, carrying out a reconstruction process for managing uniformly recording medium numbers to which recorded programs recorded on the same tape-like recording medium should correspond;

wherein said reconstruction means comprises:
identification information extracting means for extracting the program number information recorded with respect to each recorded program from the tape-like recording medium to be subjected to a reconstruction process; and
storage control means which can store the program number information of each of the recorded programs extracted by said identification extracting means so that the program number information corresponds to a predetermined recording medium number.

2. A recorded program information managing method of managing information concerning a recorded program recorded on a tape-like recording medium, comprising the steps of:

setting as a recorded program information a recording medium number information indicative of different recording medium numbers assigned to tape-like recording media where at least recorded programs are recorded and a program number information indicative of different program numbers assigned to recorded programs;

recording at least said program number information as a recorded program identification information on a tape-like recording medium by superimposing said program number information on a video signal of the recorded program;

storing in a storage area said program number information as recorded program information concerning respective recorded programs recorded on the tape-like recording medium so that said program number information should correspond to said recording medium number information assigned to the tape-like recording medium where a recorded program to which the program number information assigned is recorded; and reconstructing said storage area, if said storage area stores program number information of recorded programs recorded on the same tape-like recording medium in correspondence with different recording medium number information, carrying out a reconstruction process for managing uniformly recording medium numbers to which recorded programs recorded on the same tape-like recording medium should correspond;

wherein said reconstruction process comprises the steps of:
extracting the program number information recorded with respect to each recorded program from the tape-like recording medium to be subjected to the reconstruction process; and
reconstructing the program number information of each of the recorded programs extracted so that the program number information corresponds to a predetermined recording medium number.

3. A recording and reproducing apparatus having recording and reproducing means for recording and reproducing a tape-like recording medium, comprising:

recorded program information setting means for setting as recorded program information a recording medium number information indicative of different recording medium numbers assigned to tape-like recording media where at least recorded programs are recorded and a program number information indicative of different program numbers assigned to recorded programs;

recording control means for recording at least said program number information as a recorded program identification information on a tape-like recording medium by superimposing said program number information on a video signal of the recorded program;

storage means for storing said program number information as recorded program information concerning respective recorded programs recorded on the tape-like recording medium so that said program number information should correspond to said recording medium number information assigned to the tape-like recording medium where a recorded program to which the program number information assigned is recorded, thereby making it possible to manage information concerning the recorded programs recorded on the tape-like recording medium; and reconstruction means for, if said storing means stores program number information of recorded programs recorded on the same tape-like recording medium in correspondence with different recording medium number information, carrying out a reconstruction process for managing uniformly recording medium numbers to which recorded programs on the same tape-like recording medium should correspond;

wherein said reconstruction means comprises:
identification information extracting means for extracting the program number information recorded with respect to each of the recorded program from the tape-like recording medium to be subjected to the reconstruction process; and
storage control means which can store the program number information of each of the recorded programs extracted by said identification extracting means so that the program number information corresponds to a predetermined recording medium number.

4. A recording and reproducing apparatus according to claim 3, wherein said storage means is arranged so as to be able to store recorded program guide information indicative of required guide information concerning recorded programs so that the recording program guide information correspond to said program number information.

5. A recording and reproducing apparatus according to claim 3, further comprising:

cue-up and playback control means for cueing up and playing back a designated recorded program with said recording and reproducing means, wherein said cue-up and playback control means determines whether the program number information stored by said storage means and indicative of the designated recorded program is in conformity with the program number information extracted from the reproduced video signal of each of the recorded programs recorded on the tape-like recording medium, and controls said recording and reproducing means to cue-up and play back the recorded program whose information is in conformity with the information stored by said storage means, among the recorded programs recorded on the tape-like recording medium.

6. A recording and reproducing apparatus according to claim 3, wherein said tape-like recording medium has predetermined areas which store index signals indicative of start positions of the respective recorded programs, and said cue-up and playback control means controls said recording and reproducing means to play back the tape-like recording medium to detect the index signals to access the start positions of the respective recorded programs and also to play back the tape-like recording medium to produce reproduced video signals upon which recording medium numbers and program numbers of the recorded programs accessed at the start positions thereof are superimposed, for extracting program number information from reproduced video signals of the respective programs recorded on the tape-like recording medium.

7. A recording and reproducing method having recording and reproducing means for recording and reproducing a tape-like recording medium, comprising the steps of:

setting as recorded program information a recording medium number information indicative of different recording medium numbers assigned to tape-like recording media where at least recorded programs are recorded and a program number information indicative of different program numbers assigned to recorded programs;

recording at least said program number information as a recorded program identification information on a tape-like recording medium by superimposing said program number information on a video signal of the recorded program;

storing in a storage area said program number information as recorded program information concerning respective recorded programs recorded on the tape-like recording medium so that said program number information should correspond to said recording medium number information assigned to the tape-like recording medium where a recorded program to which the program number information assigned is recorded, thereby making it possible to manage information concerning the recorded programs recorded on the tape-like recording medium; and reconstructing said storage area, if said storage area stores program number information of recorded programs recorded on the same tape-like recording medium in correspondence with different recording medium number information, carrying out a reconstruction process for managing uniformly recording medium numbers to which recorded programs recorded on the same tape-like recording medium should correspond, wherein said step of reconstructing comprises the steps of:
extracting the program number information recorded with respect to each recorded programs from the tape-like recording medium to be subjected to the reconstruction process; and reconstructing the program number information of each of the recorded programs extracted so that the program number information corresponds to a predetermined recording medium number.

8. A recording and reproducing method according to claim 7, wherein said storage area is arranged to store recorded program guide information indicative of predetermined program guide information relative to recorded programs in association with the program number information; and further comprising the step of:

displaying the recorded programs based on the recorded program guide information stored in said storage area.

9. A recording and reproducing method according to claim 7, further comprising the step of:

cueing up and playing back a designated recorded program; and wherein said step of cueing up and playing back a designated recorded program determines whether the program number information stored in said storage area and indicative of the designated recorded program are in conformity with the program number information extracted from the reproduced video signal of each of recorded programs recorded on the tape-like recording medium, and cues up and plays back the recorded program whose information is in conformity with the information stored in said storage area, among the recorded programs on the tape-like recording medium.

10. A recording and reproducing method according to claim 7, wherein said tape-like recording medium has predetermined areas which store index signals indicative of start positions of the respective recorded programs, and step of cueing up and playing back a designated recorded program plays back the tape-like recording medium to detect the index signals to access the start positions of the respective recorded programs and also plays back the tape-like recording medium to produce reproduced video signals upon which program numbers of the recorded programs accessed at the start positions thereof are superimposed, for extracting recording number information and program number information from reproduced video signals of the respective programs recorded on the tape-like recording medium.

* * * * *